(12) United States Patent
Rasmussen

(10) Patent No.: US 9,755,135 B1
(45) Date of Patent: Sep. 5, 2017

(54) HIGHLY ELECTROACTIVE MATERIALS AND HIGHLY ELECTROACTIVE ACTUATORS THAT ACT AS ARTIFICIAL MUSCLE, TENDON, AND SKIN

(71) Applicant: RAS Labs, LLC, Quincy, MA (US)

(72) Inventor: Lenore Rasmussen, Hingham, MA (US)

(73) Assignee: RAS Labs, LLC, Quincy, MA (US)

(*) Notice: Subject to any disclaimer, the term of this patent is extended or adjusted under 35 U.S.C. 154(b) by 1116 days.

(21) Appl. No.: 13/843,959

(22) Filed: Mar. 15, 2013

(51) Int. Cl.
  *H01L 41/00* (2013.01)
  *H01L 41/09* (2006.01)
  *H05K 13/00* (2006.01)

(52) U.S. Cl.
  CPC ......... *H01L 41/0926* (2013.01); *H05K 13/00* (2013.01)

(58) Field of Classification Search
  CPC ........................................................ C08F 2/46
  USPC .................................. 427/2.24, 58, 488, 487
  See application file for complete search history.

(56) References Cited

U.S. PATENT DOCUMENTS

| | | | |
|---|---|---|---|
| 5,736,590 | A | 4/1998 | Rasmussen |
| 6,109,852 | A | 8/2000 | Shahinpoor |
| 7,923,064 | B2 | 4/2011 | Pelrine |
| 7,935,743 | B1 | 5/2011 | Rasmussen |
| 8,088,453 | B1 * | 1/2012 | Rasmussen ............ F03G 7/005 427/487 |
| 2011/0478431 | | 6/2006 | Rasmussen |
| 2012/0319804 | A1 | 12/2012 | Mahon et al. |

OTHER PUBLICATIONS

Yang. Building artificial muscle actuators from carbon nanotubes. Literature seminar Nov. 7, 2013.*
Kang et al. Solid-state Conducting Polymer Actuator based on Electrochemically-deposited Polypyrrole and Solid Polymer Electrolyte.High Performance Polymers, 18: 665-678, 2006.*
U.S. Appl. No. 12/319,804, filed Jan. 13, 2009, Rasmussen.
U.S. Appl. No. 11/428,431, filed Jun. 30, 2006, Rasmussen.

* cited by examiner

*Primary Examiner* — Cachet Sellman
(74) *Attorney, Agent, or Firm* — Wilmer Cutler Pickering Hale and Dorr LLP

(57) ABSTRACT

This invention describes a method for producing a novel, superior, highly electroactive material and highly electroactive actuator, which act as artificial muscle, tendon, fascia, perimysium, epimysium, and skin that wrinkles and with the preferred movement of contraction, comprising ion-containing, cross-linked electroactive material(s); solvent(s); electrode(s); attachments to levers or other objects; and coating (s). The composition and electrode configuration of the highly electroactive material of the highly electroactive actuator can be optimized so that contraction occurs when activated by electricity, and when allowed to relax back to its original conformation or when the polarity of the electrodes is reversed, expansion occurs, and a combination of these movements can be arranged, such as antagonistic pairs. The highly electroactive material itself or the highly electroactive actuator may be used individually or grouped to produce movement when activated by electricity. This invention can provide for human-like motion, durability, toughness, and strength.

51 Claims, 5 Drawing Sheets

HIGHLY ELECTROACTIVE MATERIALS AND HIGHLY ELECTROACTIVE ACTUATORS THAT ACT AS ARTIFICIAL MUSCLE, TENDON, AND SKIN

TECHNICAL FIELD OF THE INVENTION

This invention relates to a composition and a method for producing materials and actuators that respond to electricity, converting electrical energy into mechanical energy in the form of movement, causing said electroactive materials and electroactive actuators to act as artificial muscle, tendon, human-like skin, and for use with mechanical devices.

BACKGROUND OF THE INVENTION

Electroactive materials can be broadly separated into three types of materials: piezoelectric materials, elastomers between two electric plates, and ion-containing materials. Most piezoelectric materials undergo length changes of only a fraction of one percent. The movement from electroactive materials that use an elastomer between two electric plates is visible to the naked eye, however these materials use extremely high voltages, measured in the kilovolt range, and once that type of electroactive material is activated it remains static. With ion-containing electroactive materials, the material itself responds to electricity by movement that is visible to the naked eye, and as long as the electricity is on, these materials typically continue to move. The voltage requirements for ion-containing electroactive materials are much lower than elastomeric electroactive materials, typically less than 100 volts. Historically, ion-containing electroactive materials have had some drawbacks. Many of the ion-containing electroactive polymers are inherently weak materials and, typically being hydrogels, if they dry out, then they become hard, brittle, inflexible, and thus electrically unresponsive.

Applicant has previously found that copolymers comprising cross-linked networks of methacrylic acid and 2-hydroxyethyl methacrylate, (PMA-co-PHEMA) cross-linked with cross-linking agents such as ethylene glycol dimethacrylate and 1,1,1-trimethylolpropane trimethacrylate, are superior ionic electroactive materials, with tensile strengths well above the tensile strengths of other ion-containing electroactive materials found in the prior art at that time (U.S. Pat. No. 5,736,590, [1998]). A relatively small amount of electricity caused movement.

TABLE 1

Strengths of some common ion-containing electroactive polymers compared to PMA-co-PHEMA cross-linked networks

| Material | Tensile Strength (MPa) |
| --- | --- |
| Poly(acrylamide) gels | 0.03 |
| Poly(vinyl alcohol)-co-poly(acrylic acid) gels | 0.23 |
| Poly(2-hydroxyethyl methacrylate)-co-poly(methacrylic acid) cross-linked networks* | 0.33 |

*0.28 to 0.76 MPa range for these types of materials

In 2004 and 2005, applicant developed strong electroactive materials that had pronounced responsive movement to electricity, which led to another drawback. If the electroactive material responded quickly with a lot of movement, then the electrodes often detached. If even one electrode detached, then the actuator failed. This challenge was addressed by plasma treating the electrodes to improve the polymer-metal interface, so that the electrodes and the electroactive material would work as a unit, similar to how nerves are integrated into muscle tissue. By plasma treating the electrodes, which are inserted or embedded into the electroactive material, a much better polymer-metal interface could be achieved between the embedded electrodes and the electroactive material as described in applicant's U.S. patent application Ser. No. 11/478,431 and U.S. Pat. No. 7,935,743. A good polymer-metal interface is crucial because the electroactive materials developed by applicant undergo pronounced movement. Applicant has found that by encapsulating or coating the electroactive materials, with embedded electrodes, the actuator can be free-standing, independent of submersion in an electrolytic solution as described by applicant's U.S. patent application Ser. No. 11/478,431 and U.S. Pat. No. 7,935,743.

In 2008, applicant discovered that electroactive materials and electroactive actuators described in U.S. patent application Ser. No. 12/319,804 and U.S. Pat. No. 8,088,453 that used ion-containing electroactive materials and that are produced within a defined range of cross-linking, along with other considerations, such as dilution of the monomer mix, choice of electrolyte, and the configuration of the electrodes, allowed for the preferred movements of contraction. Electroactive polymers in the prior art undergo a variety of movement. The movement of contraction is considered to be an extremely useful movement because of the similarity to movement produced by muscle tissue. U.S. Pat. No. 8,088,453 disclosed compositions of electroactive materials that undergo contraction and electrode configurations that further increase contraction in these electroactive materials and electroactive actuators. A superior method to significantly improve the polymer-metal interface was described, preferably by plasma treating the titanium metal electrodes of the actuators with nitrogen plasma, followed by oxygen plasma or treated individually with either nitrogen plasma or oxygen plasma. By encapsulating or coating the electroactive materials, with embedded electrodes, these actuators can be operational anywhere.

The advantage of this invention over the prior art is that by blending the acetate of methacrylic acid with its suitable associated cation, such as sodium ion, with methacrylic acid, and cross-linking, the final material does not need an electrolyte post-treatment step, the unnecessary anion (from electrolyte salt) is eliminated from the final material, and the final material is extremely electroactive. Because of the high electroactivity of these novel materials, other cross-linking strategies, including the use of two or more different cross-linking agents, provide for tough, highly electroactive materials.

Because these novel highly electroactive materials undergo such drastic size changes, several strategies are used to keep the actuator together in the current invention. In addition to plasma treatment, base treatment, etching, or otherwise treating the electrodes, a bending, spiral shaped, or preferably spring shaped internal embedded electrode greatly improves the durability of the actuator because the metal electrode can flex as the highly electroactive material changes its dimension. For applications where high flexibility of actuation is needed, carbon fibers, carbon weaves, and carbon felts adhere well to these novel highly electroactive materials. By placing the positive electrode inside the highly electroactive material described, and having the negative electrode slightly external to the highly electroactive material, with suitable conduction through conductive solvent, such as distilled water with a slight amount of salt present or water containing metal and other ions, such as tap water, and applying electric input, contraction occurs. When the polarity of the electrodes is reversed, expansion occurs. Contraction and expansion can be cycled repeatedly. Also, at the distal ends of the actuator, where the internal electrode enters highly electroactive material and where any attachments enter the highly electroactive material, a stronger formulation is provided at the distal ends. This tethers the electrodes and any attachments firmly into place where they enter the highly electroactive material of the highly electroactive actuator.

The coating of the highly electroactive actuator in the instant invention can be a bilayer coating, where the inner layer is flexible and conductive so also serves as the slightly external electrode, and the outer layer serves to retain moisture of the electroactive material inside, allowing these actuator to be operational anywhere.

The coating of the highly electroactive actuator in the instant invention can be a trilayer coating, where the inner most layer can be used to force actuation in a desired direction, for example, for a linear push-pull actuator. The most inner layer is somewhat stiff and rigid, restricting motion in one plane thus maximizing motion in the desired direction for actuation. This inner layer also helps to retain the integrity of the highly electroactive material of the highly electroactive actuator. This most inner layer of the trilayer coating has small holes or is porous to allow conductive solvent to the middle layer. The middle layer of the trilayer coating serves as the negative electrode. The outer layer of the trilayer coating is elastomeric and helps to retain moisture and integrity of the highly electroactive material of the highly electroactive actuator, allowing the actuator to be operational anywhere.

For applications where these novel highly electroactive materials and actuators are subjected to cold environments, a small amount of antifreeze, such as glycerol or diethylene glycol, can be added to the solvent. The solvent is preferably water.

The instant invention may revolutionalize robots and prostheses by providing highly electroactive materials and highly electroactive actuators that have smooth two and three dimensional range of motion, good durability, high strength, and that may operate over a wide variety of environmental conditions. The degree of contraction, and expansion when the polarity is reversed, can be controlled by the voltage level of the electric input, so biofeedback could easily be linked in using these materials and actuators.

SUMMARY OF THE INVENTION

This invention discloses a method for producing said novel, superior, highly electroactive material and said highly electroactive actuator, which act as artificial muscle, tendons, nerves, and devices where movement is required with the preferred movements of contraction and expansion when electricity is applied to the highly electroactive material. This is accomplished by producing a highly electroactive material comprising at least one monomer, at least one salt of an ion-containing monomer, controlling the amount of cross-linking of the highly electroactive material, diluting the monomer mix prior to polymerization, swelling the highly electroactive material in appropriate solvent, plasma treating or otherwise treating the electrodes with nitrogen plasma followed by oxygen plasma to improve the metal-polymer interface, optimizing the configuration and shape of the electrodes, attaching fibers or rods if needed to the highly electroactive material and to other objects such as levers, and coating the electroactive material to allow the highly electroactive material and the highly electroactive actuator to operate anywhere. In the synthesis, by blending the acetate of methacrylic acid with its associated cation (Group 1 cation, such as sodium or potassium, or any stable cation) with methacrylic acid, and then cross-linking, the post-synthesis electrolyte induction step is eliminated. This also removes the unnecessary anion, typically chlorine ion, from an electrolyte salt in the final composition. In addition, the final material is extremely electroactive. This greater electroactivity allows for stronger cross-linking strategies to be used. Another synthetic strategy is to use more than one cross-linking agent, for example, one cross-linking agent with a functionality of 4 and another cross-linking agent with a functionality of 6, to further improve physical properties such as toughness, leading to greater durability in these highly electroactive materials. This invention provides for materials and actuators that are stronger, tougher, more electroactive, with easier synthesis due to less volatiles during synthesis, and simplified post-synthesis procedures. The electrodes can be plasma treated metal, based treated, etched or otherwise treated metal. For even more flexible actuation, carbon fibers, carbon weaves, or carbon felt can be used as electrodes. To produce movement or work, the highly electroactive material of the electroactive actuator is activated by applying electricity through the electrodes. To enhance contraction and expansion, one electrode is embedded in the highly electroactive material, and the other electrode is positioned slightly external to the highly electroactive material, but still in electric contact through the solvent. For contraction, the positive electrode is positioned inside the highly electroactive material and the negative electrode is slightly external to the highly electroactive material. For expansion, the polarity is simply reversed so that the internal electrode is negative and the external electrode is positive. Contraction and expansion in these novel highly electroactive materials can be cycled repeatedly. Because the highly electroactive material undergoes such drastic size changes, several strategies are used to keep the actuator together. A bending, spiral shaped, or preferably spring shaped internal embedded electrode greatly improves the durability of the actuator because the metal electrode can flex as the highly electroactive material changes its dimension. Also, at the distal ends of the highly electroactive actuator, where the internal electrode enters highly electroactive material and where any attachments enter the highly electroactive material, a stronger formulation is provided at the distal ends, to tether the electrodes and any attachments firmly into place where they enter the highly electroactive material. This can easily be done using a multi-phasic synthetic approach, where the distal ends of the actuator are a different formulation, preferably much more cross-linked, than the more central electroactive zone of the actuator. The coating of the actuator can be a bilayer coating, where the inner layer is flexible and conductive so also serves as the slightly external electrode, and the outer layer serves to retain moisture of the highly electroactive material inside, allowing these actuator to be operational anywhere. The coating can be a trilayer coating, where the inner most layer can be used to force actuation in a desired direction, for example, for a linear push-pull actuator. The most inner layer is somewhat stiff and rigid, restricting motion in one plane thus maximizing motion in the desired direction for actuation. This inner layer also helps to retain the integrity of the highly electroactive material of the highly electroactive actuator. This most inner layer of the trilayer coating has small holes or is porous to allow conductive solvent to the middle layer. The middle layer of the trilayer coating serves as the negative electrode. The outer layer of the trilayer coating is elastomeric and helps to retain moisture and integrity of the highly electroactive material of the highly electroactive actuator, allowing the actuator to be operational anywhere. For applications where these novel highly electroactive materials and actuators are subjected to cold environments below the freezing temperature of the solvent, a small amount of antifreeze, such as glycerol or diethylene glycol, can be added to the solvent. The solvent is preferably water. The degree of contraction, and expansion when the polarity is reversed, can be controlled by the voltage level of the electric input, so biofeedback can be linked in using these materials and actuators. The instant invention may revolutionize robots and prostheses by providing highly electroactive materials and highly electroactive actuators that have smooth two and three dimensional range of motion, good durability, high strength, and that may operate over a wide variety of environmental conditions. The preferred movements of these novel highly electroactive materials and highly electroactive actuators are contraction and expansion, which may allow for human-like robots and prostheses with life-like motion. The highly electroactive actuator can be made in a variety of shapes, sizes, and tendon-like strands.

With the above limitation of the current approaches in mind, it is an object of the present invention to provide a method and system that produces a highly electroactive material and highly electroactive actuator where the movement is contraction in addition to other movements such as expansion, bending, flexing, wrinkling, buckling, rippling, or the combination of these movements.

Another object of the present invention is to provide a method and system that produces a highly electroactive material and highly electroactive actuator that when activated by electricity produces movement or work.

Another object of the present invention is to provide a method and system that produces a highly electroactive material and highly electroactive actuator that when activated by electricity repeatedly, moves and works repeatedly as a durable cohesive unit.

Another object of the present invention is to provide a method and system that produces a highly electroactive material and highly electroactive actuator where robots and prostheses have human-like motion.

Another object of the present invention is to provide a method and system that produces a highly electroactive material and highly electroactive actuator that wrinkles or moves in a way to feel like human skin to the touch.

Another object of the present invention is to provide a method and system that produces a highly electroactive material and highly electroactive actuator that wrinkles or moves in a way to appear like human skin.

Another object of the present invention is to provide a method and system that produces a highly electroactive material and highly electroactive actuator that feels warm to the touch. When electricity is applied, heat is generated, and the electroactive material becomes warm.

A fuel cell system can be added close to the highly electroactive actuator so that when said highly electroactive actuator is operating above 1.23 V and thus producing gases in an aqueous solvent, the gases are used by the fuel cell to produce electricity and water, which can be provided back to said highly electroactive actuator. By tying in with a fuel cell, a series of toroid shaped highly electroactive materials could operate as peristaltic valves on the outside of a liner in order to operate as a peristaltic pump, to produce an energy efficient pump.

The objects, advantages, and features of the present invention are readily apparent from the following description of the preferred embodiment for carrying out the invention when taken in connection with the accompanying drawings.

A more complete appreciation of the invention and many of the attendant advantages and features thereof may be readily understood by reference to the following more detailed description of the drawings in which the reference characters indicate corresponding parts in all views and the detailed description.

The instant invention discloses and claims an electroactive actuator comprising a superior highly electroactive material, and a method for producing a said, superior, highly electroactive material comprising at least one ion-containing monomer, at least one salt of an ion-containing monomer, controlling the amount of cross-linking, diluting the monomer mix prior to polymerization, swelling the highly electroactive material in an appropriate solvent, plasma treating, base treating, etching, or otherwise treating the electrodes, preferably of titanium with nitrogen plasma followed by oxygen plasma, attaching fibers or rods if needed to the highly electroactive material, tethering the distal ends where the electrodes and attachments enter the higher electroactive material with a higher matrix formulation, and encapsulating the highly electroactive material, with its electrodes and possibly other fibers or rods, so that it can operate anywhere. The highly electroactive materials and highly electroactive actuators respond by movement, particularly contraction, and conversely expansion, to electricity, and are also strong, tough, resilient materials well suited for use where motion is required, even repetitious use. The electroactive material, also called the smart material, intelligent material, electroactive polymer, or electroresponsive material, comprises of a flexible ion-containing material, such as a polymer comprising ion-containing monomers, such as methacrylic acid and the acetate of methacrylic acid with its associated cation, which can also contain non ion-containing polymers comprising monomers, such as 2-hydroxyethyl methacrylate, vinyl alcohol, or other monomers, cross-linked with poly (ethylene glycol) dimethacrylate or other suitable cross-linking agents, such as diurethane dimethacrylate, 1,1,1-trimethylolpropane trimethacrylate, ethylene glycol dimethacrylate, or a combination of cross-linking agents. Other electroactive polymers may also be used as the electroactive material or as a component of the electroactive material, such as ionized poly(acrylamide), poly(acrylic acid), poly(acrylic acetate), poly (acrylic acid)-co-poly (acrylamide), poly(2-acrlyamide-2-methyl-1-propane sulfonic acid), poly(methacrylic acid), poly(methacrylic acetate), poly(2-hydroxyethyl methacrylate), poly(vinyl alcohol), poly(styrene sulfonic acid), quarternized poly(4-vinyl pyridinium chloride), poly(vinylnbenzyltrimethyl ammonium chloride), sulfonated poly(styrene), or materials that respond to electricity by movement, expansion, contraction, curling, bending, buckling, or rippling. The preferred highly electroactive material comprises the monomer methacrylic acid and the acetate of methacrylic acid, sodium salt, polymerized and cross-linked, preferably with the cross-linking agent poly(ethylene glycol) dimethacrylate, cross-linked at a low level, less than 5.0 mole percent with respect to methacrylic acid and methacrylic acetate, preferably cross-linked within a range of 0.30 to 2.5 mole percent poly(ethylene glycol) dimethacrylate with respect to methacrylic acid and methacrylic acetate, and preferably initiated with the photo-initiator 1-hydroxycyclohexylphenyl ketone, also called Irgacure 184®, in a concentration of 0.42 mole % with respect to methacrylic acid and methacrylic acetate. Prior to polymerization, the monomers, cross-linking agent(s), and initiator are diluted with a solvent compatible with the ion-containing monomers, preferably distilled water. Ultraviolet light radiation is preferably used to induce polymerization, but heat induced free radical polymerization using 2,2'-azodiisobutyronitrile (AIBN) or other free radical initiators can also be used. AIBN is especially useful when a foam is desired for the final electroactive material. Light induced polymerization is considered one of the most efficient techniques for rapidly producing polymeric materials with well-defined characteristics, particularly for cross-linked networks. Photopolymerization is often the method of choice for rapid, assembly style, through-put polymerizations. Visible light induced radiation using a suitable photoinitiator, such as phenylbis(2,4,6-trimethylbenzoly)phosphine oxide, also called Irgacure 819®, has also been used with good results. Gamma radiation can also be used to polymerize these novel materials. Gamma radiation initiated polymerization is useful when the addition of an initiator is undesirable, or if the polymerization batch absorbs light too much because of pigments or because of the monomer being impregnated into porous materials. Gamma radiation is also used for sterilization purposes. Gamma radiation may be the polymerization mechanism of choice for polymers that must also be microbially sterile. Once polymerized and cross-linked, the electroactive material can be further swollen in a compatible solvent, preferably water, but electrolyte solution also works well. Plasma treating, such as nitrogen plasma treatment, oxygen plasma treatment, argon plasma treatment, or preferably nitrogen plasma treatment followed by oxygen plasma treatment, or otherwise treating the preferably titanium based electrodes, produced an improved metal-polymer interface, which is crucial for the success of the highly electroactive actuator because of the pronounced movements of the highly electroactive material(s). Because these novel highly electroactive materials undergo such drastic size changes, several more strategies are used to keep the actuator together in the current invention. A bending, spiral shaped, or preferably spring shaped internal embedded electrode greatly improves the durability of the actuator because the metal electrode can flex as the highly electroactive material changes its dimension. For applications where high flexibility of actuation is needed, carbon fibers, carbon weaves, and carbon felts adhere well to these novel highly electroactive materials. At the distal ends of the actuator, where the internal electrode(s) enters the highly electroactive material and where any attachment(s) enter the highly electroactive material, a stronger formulation is provided, preferably with higher cross-linking, at the distal ends compared to the more central area of the electroactive material. This multi-phasic synthetic approach tethers the electrodes and any attachments firmly into place where they enter the highly electroactive material, analogous to muscle tissue having tendons that attach to bone. By placing the positive electrode inside the highly electroactive material described, and having the negative electrode slightly external to the highly electroactive material, with suitable conduction through conductive solvent, such as distilled water with a slight amount of salt present or water containing metal and other ions, such as tap water, and applying electric input, contraction occurs. When the polarity of the electrodes is reversed, expansion occurs. Contraction and expansion can be cycled repeatedly. The ends of the electrodes in or near the highly electroactive may be splayed, untwisted, arranged into one or more filaments, meshes, nets, wires, or fibers. Covering the outer surface of the highly electroactive material with one or more coating(s) of elastomeric material allows for the electroactive material to be removed form immersion in compatible solvent or electrolyte solution and operational in a variety of environments. The coating of the actuator in this invention can be a bilayer coating, where the inner layer is flexible and conductive so also serves as the slightly external electrode, and the outer layer serves to retain moisture of the highly electroactive material inside. The coating of the highly electroactive actuator can be a trilayer coating, where the inner most layer restricts motion in one direction thus maximizing motion in the desired direction for actuation and helps to retain the integrity of the highly electroactive material. This most inner layer of the trilayer coating has small holes or is porous to allow conductive solvent to the middle layer. The middle layer of the trilayer coating serves as the negative electrode. The outer layer of the trilayer coating is elastomeric and helps to retain moisture and the integrity of the highly electroactive material of the highly electroactive actuator, allowing the actuator to be operational anywhere. For applications where these novel highly electroactive materials and highly electroactive actuators are subjected to cold environments, a small amount of antifreeze, such as glycerol or diethylene glycol, can be added to the solvent. The solvent is preferably water. The described composition, method, and configuration of the highly electroactive material and highly electroactive actuator, with electrodes, and sealed with protective, elastomeric coating(s), acts as an artificial muscle within a protective "skin", where the electrodes serves as "nerves" delivering the electric impulse to the highly electroactive material of the highly electroactive actuator, and the electrodes can also serve as "tendons" independently or with other materials to connect the highly electroactive material (s) of the highly electroactive actuator(s) to levers, joints, valves, mechanical devices, toys, or other objects. Carbon particles, fibers, felts, weaves, nano-particles, or nano-tubes, metal ions, or any other electrically conductive material, may be included in the highly electroactive material to enhance its electroactivity. Fibers, weaves, felts, or other materials may be attached to the highly electroactive material(s) and to levers, hinges, joints, valves, or other objects to produce movement and work, in conjunction with or independent of the electrodes. The highly electroactive material or the highly electroactive actuator may be used individually or grouped together in fibers, bulk, slabs, bundles, or other configurations to hinge joints, rotator (ball-and-socket) type joints, other joints, other hinges, hole-filling applications, hole-plugging applications, valves, catheters, stents, levers, other objects, or anywhere movement or work is required. To produce movement or work, the highly electroactive material of the highly electroactive actuator is activated by electricity, the highly electroactive material of the electroactive actuator relaxes or returns to its original conformation after the electricity is stopped, the polarity of the electrodes is reversed, or a combination of movements from activation and relaxation or from reversing the polarity of the electrodes. The degree of contraction, and expansion when the polarity is reversed, can be controlled by the voltage level of the electric input, so biofeedback could easily be linked in using these materials and actuators. An example of using a combination of movements is to arrange, place, or configure the highly electroactive materials or highly electroactive actuators as antagonistic pairs, similar to how muscles are arranged around joints. Antagonistic pairs are utilized to grip and hold as thumb and fingers do. By optimizing the highly electroactive material(s) and highly electroactive actuator(s) in terms of electroactivity, electrode configuration, mode of movement, and physical properties, electroactive materials and electroactive actuators may be designed for various applications, such as prostheses, robots, automation, toys, catheters, stents, devices that fly, swim, walk, run, climb, stretch, swing, grasp, or use a combination of motions, valves, medical applications, industrial applications, or anywhere movement, particularly contraction or expansion, is desired. A thin layer of the highly electroactive material may also function as human-like fascia, perimysium, epimysium, and skin that even wrinkles. When electricity is applied, heat is generated, and the electroactive material becomes warmer, which makes it feel warm to the touch.

SOURCES OF SUPPLY

Methacrylic acid can be purchased from Sigma-Aldrich, St. Louis, Mo., Monomer-Polymer Dajac Laboratories, Inc., Feasterville, Pa., and other suppliers. Poly(ethylene glycol) dimethacrylate and other cross-linking agents can be purchased from Sigma-Aldrich, St. Louis, Mo., Monomer-Polymer Dajac Laboratories, Inc., Feasterville, Pa., and other suppliers. The highly electroactive materials are produced using standard free radical polymerization or photopolymerization methods. Light activated initiators, such as 1-hydroxycyclohexyl phenyl ketone or phenylbis(2,4,6-trimethylbenzoyl)phosphine oxide, can be purchased from BASF, Sigma-Aldrich, and other suppliers. Thermally activated initiators, such as 2,2'-azodiisobutyronitrile or benzoyl peroxide, can be purchased from Sigma-Aldrich, and other suppliers. Titanium based materials may be purchased from ESPI Metals, Ashland, Oreg., Dynamet, a subsidiary of Carpenter Technology Corporation, Washington, Pa., and other suppliers. Corrosion resistant stainless steel may be purchased from McMaster-Carr, Atlanta, Ga., Carpenter Technology Corporation, Reading, Pa., and other suppliers. Carbon fibers, weaves, and felts can be purchased from ACP Composites, Livermore, Calif., and other suppliers. Carbon black can be purchased from Cabot Corporation, Billerica, Mass., and other suppliers. The coating(s) for the actuator may comprise natural rubber, poly(butadiene), poly(vinylidene chloride), poly(vinyl chloride), selected polyurethanes, Pliobond®, Press'n Seal® wrap, Tesa Tape®, VHB tape, shrink-wraps, or other elastomers, or combination of materials.

DESCRIPTION OF THE DRAWINGS

Figure 1:
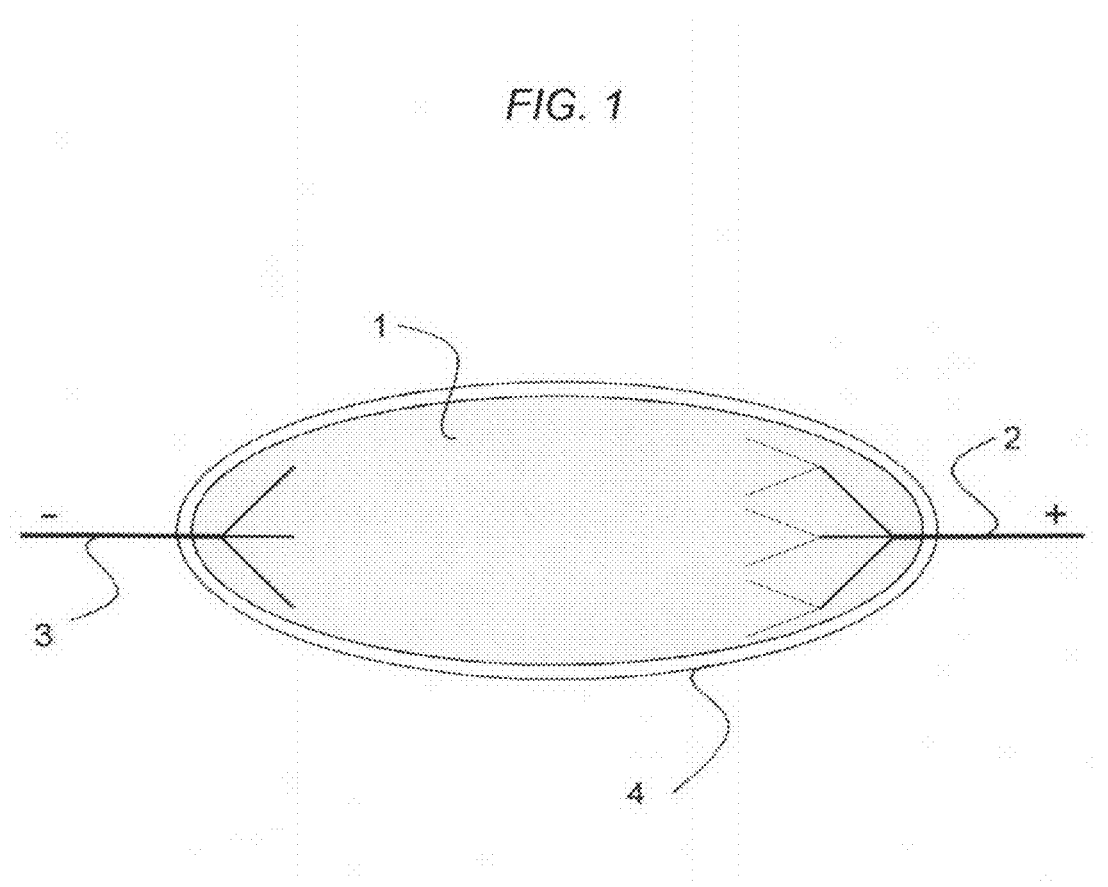
FIG. 1 is a perspective view of a highly electroactive actuator.

A more complete appreciation of the invention and many of the attendant advantages and features thereof may be readily understood by reference to the following description of the drawings in which the reference characters indicate corresponding parts in all views and the detailed description.

FIG. 1 shows a highly electroactive actuator, where 1 is the highly electroactive material, 2 is the positive electrode and 3 is the negative electrode. The ends of the electrodes can be splayed, untwisted, or arranged into filaments, meshes, nets, wires, or fibers, and inserted or embedded in the highly electroactive material 1. The highly electroactive material 1, with or without electrodes, can be encapsulated by a flexible coating 4. The distal ends of the highly electroactive material 1 where the positive electrode 2 and the negative electrode 3 enter the electroactive material are preferably a different formulation, with much higher cross-linking, than the more central electroactive area of the highly electroactive material 1. The electrodes in this depiction deliver the electric impulse and can also be attached to levers or other objects, independently or in conjunction with other fibers, to produce movement or work when the highly electroactive actuator is activated by electricity, when the highly electroactive actuator relaxes or returns to its original conformation after the electricity is stopped, when the polarity of the electrodes is reversed, or a combination of movements from activation and relaxation or from reversing the polarity of the electrodes.

Figure 2:
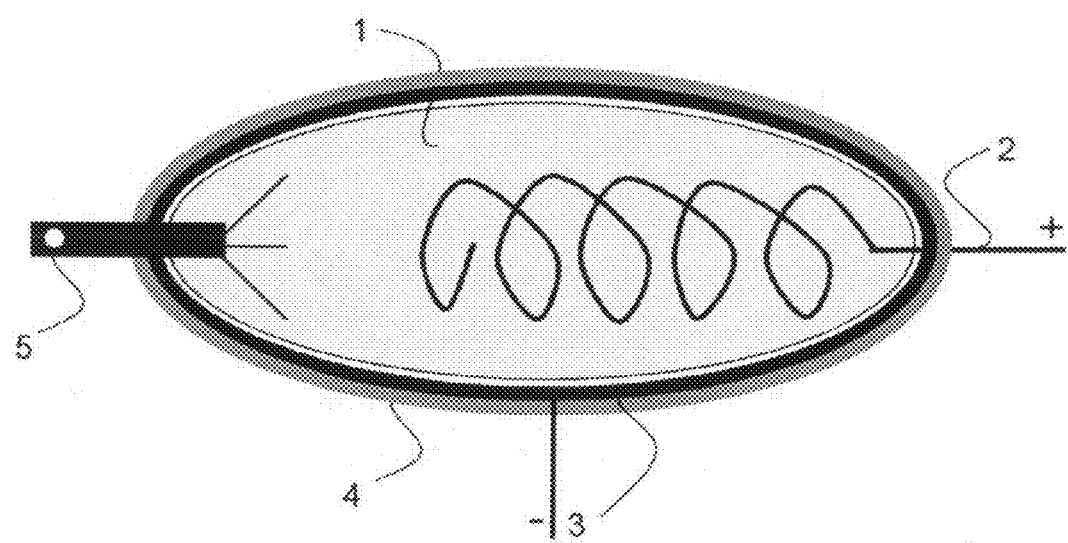
FIG. 2 is a perspective view of a highly electroactive actuator with an attachment.

FIG. 2 shows a highly electroactive actuator, where 1 is the highly electroactive material, 2 is the embedded, preferably spiral shaped, positive electrode and 3 is the negative electrode, which is also the inner layer of a bilayer coating. The ends of the electrode can be splayed, untwisted, or arranged into filaments, meshes, nets, wires, or fibers, and inserted or embedded in the highly electroactive material 1. The highly electroactive material 1, with or without electrodes, can be encapsulated by a bilayer flexible coating, where the inner bilayer 3 serves as the negative electrode and the flexible outer layer 4 of the bilayer coating retains moisture of the highly electroactive material 1, which allows for the electroactive actuator to be operational anywhere. The attachment 5 can connect to other objects to produce work. The distal ends of the highly electroactive material 1 where the positive electrode 2 and attachment 5 enter the highly electroactive material are preferably a different formulation, with much higher cross-linking, than the more central electroactive area of the highly electroactive material 1. The electrodes in this depiction deliver the electric impulse and can also be attached to levers or other objects, independently or in conjunction with other fibers, to produce movement or work when the highly electroactive actuator is activated by electricity, when the highly electroactive actuator relaxes or returns to its original conformation after the electricity is stopped, when the polarity of the electrodes is reversed, or a combination of movements from activation and relaxation or from reversing the polarity of the electrodes.

Figure 3:
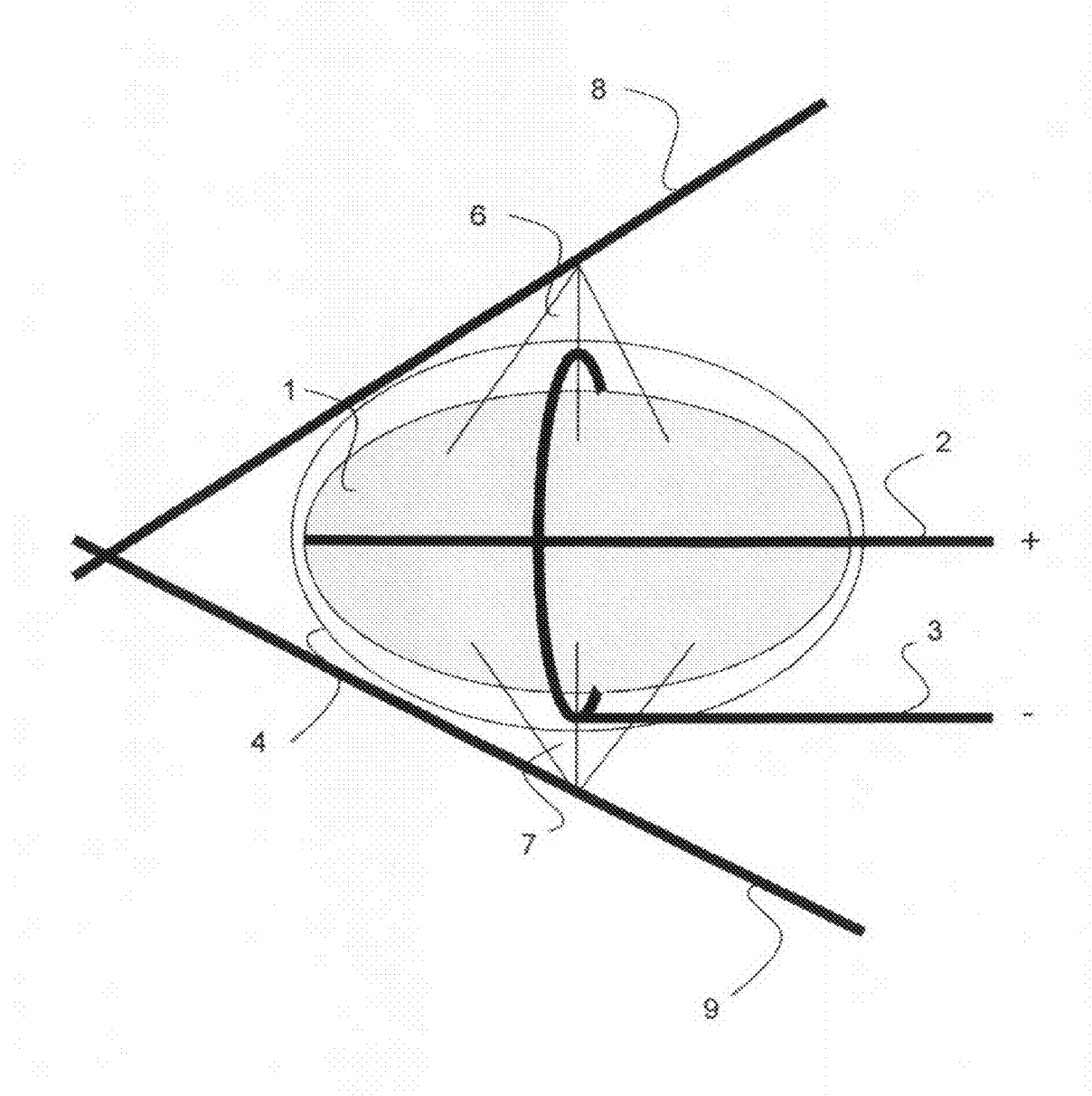
FIG. 3 is a perspective view of a highly electroactive actuator connected to two links.

FIG. 3 shows a highly electroactive actuator, where 1 is the highly electroactive material, where the positive electrode 2 is inserted, embedded, or arranged in the highly electroactive material 1, with the negative electrode 3 placed near the highly electroactive material 1, however, the negative electrode 3 can also be inserted in the highly electroactive material 1. The highly electroactive material 1, with or without electrodes, is encapsulated by a flexible coating 4. Filaments, meshes, nets, wires, fibers, web-like structures 6 and 7 connect the electroactive material 1 to levers 8 and 9 or other objects to produce movement or work when the highly electroactive actuator is activated by electricity, when the highly electroactive actuator relaxes after the electricity is stopped, when the polarity of the electrodes is reversed, or a combination of movements from activation and relaxation or from reversing the polarity of the electrodes.

Figure 4:
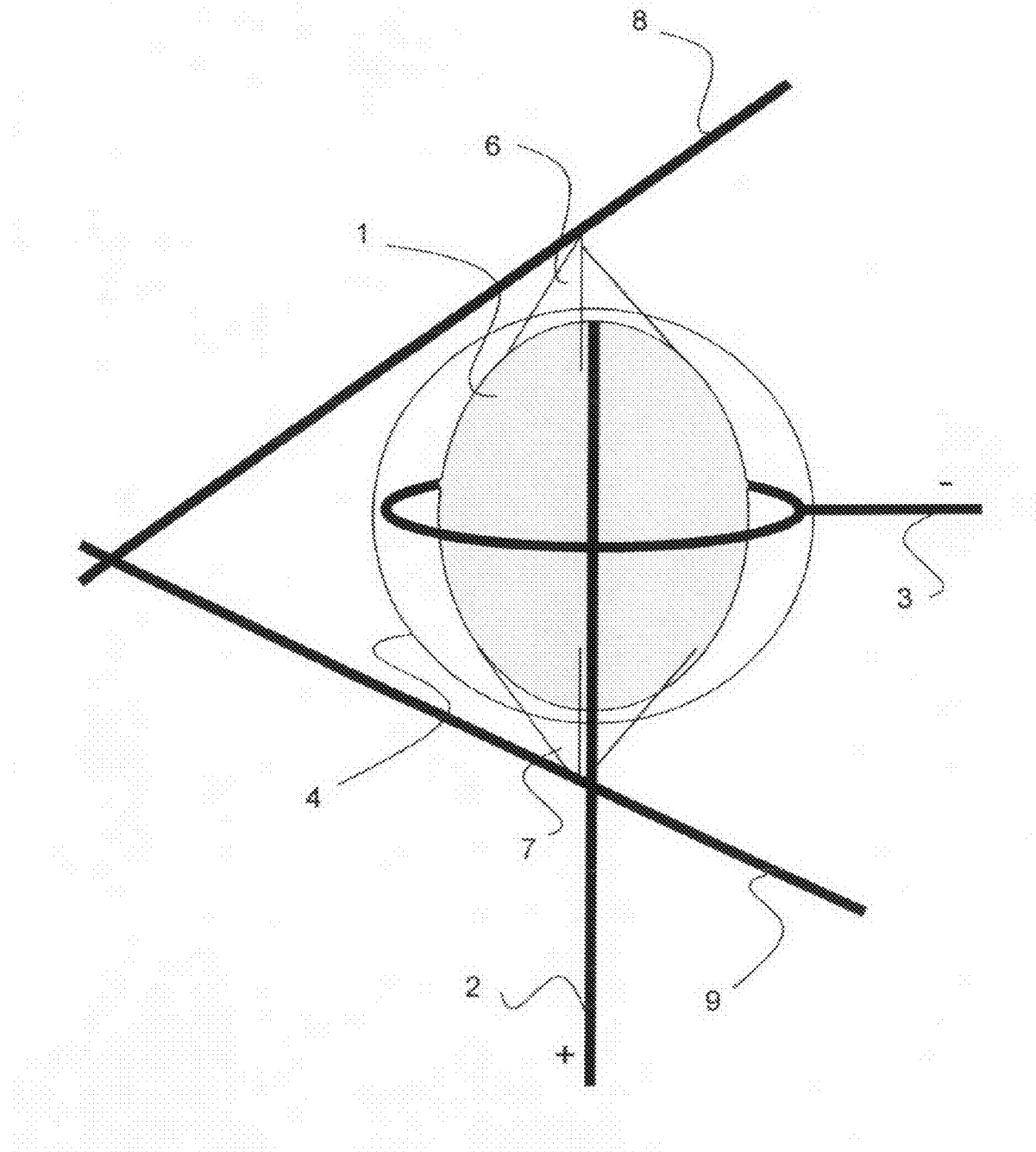
FIG. 4 is a perspective view of a highly electroactive actuator connected to two links.

FIG. 4 shows a highly electroactive actuator, where 1 is the highly electroactive material, where the positive electrode 2 is inserted, embedded, or arranged in the highly electroactive material 1, with the negative electrode 3 placed near the highly electroactive material 1, however, the negative electrode 3 may also be inserted in the highly electroactive material 1. The highly electroactive material 1, with or without electrodes, is encapsulated by a flexible coating 4. Filaments, meshes, nets, wires, fibers, or web-like structures 6 and 7 connect the highly electroactive material 1 to levers 8 and 9 or other objects to produce movement or work when the highly electroactive actuator is activated by electricity, when the highly electroactive relaxes after the electricity is stopped, when the polarity of the electrodes is reversed, or a combination of movements from activation and relaxation or from reversing the polarity of the electrodes.

Figure 5:
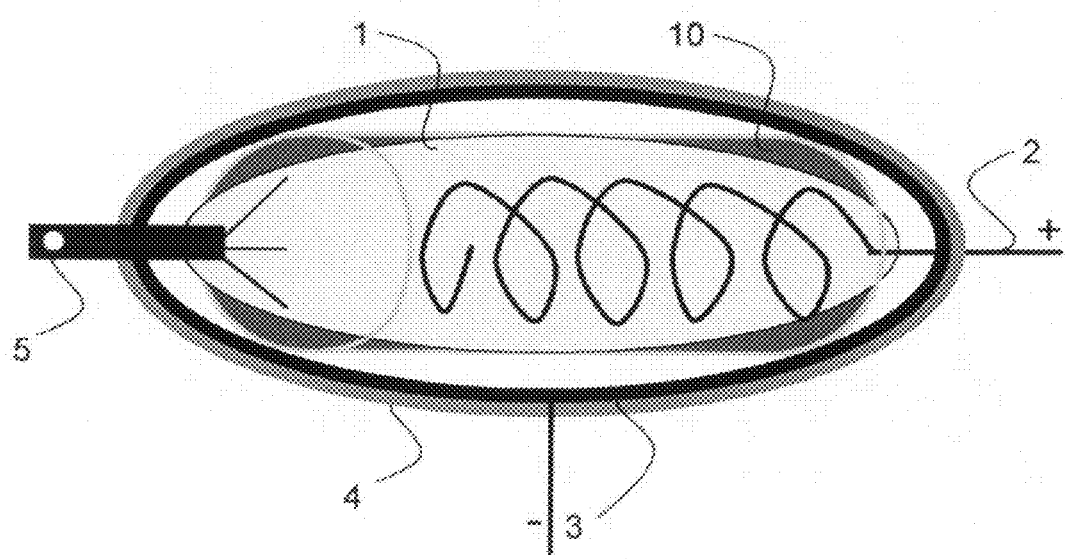
FIG. 5 is a perspective view of a highly electroactive actuator with an attachment.

FIG. 5 shows a highly electroactive actuator, where 1 is the highly electroactive material, 2 is the embedded, preferably spiral shaped, positive electrode and 3 is the negative electrode, which is also the inner layer of a trilayer coating. The ends of the electrode can be splayed, untwisted, or arranged into filaments, meshes, nets, wires, or fibers, and inserted or embedded in the highly electroactive material 1. The highly electroactive material 1, with or without electrodes, can be encapsulated by a trilayer flexible coating, where the inner layer 10 is somewhat rigid and can be can be open ended, like a tube, where the middle layer 3 of the trilayer coating serves as the negative electrode, and the flexible outer layer 4 of the trilayer coating retains moisture of the highly electroactive material 1, which allows for the electroactive actuator to be operational anywhere. The attachment 5 can connect to other objects to produce work. The distal ends of the highly electroactive material 1 where the positive electrode 2 and attachment 5 enter the highly electroactive material are preferably a different formulation, with much higher cross-linking, than the more central electroactive area of the highly electroactive material 1. The electrodes in this depiction deliver the electric impulse and can also be attached to levers or other objects, independently or in conjunction with other fibers, to produce movement or work when the highly electroactive actuator is activated by electricity, when the highly electroactive actuator relaxes or returns to its original conformation after the electricity is stopped, when the polarity of the electrodes is reversed, or a combination of movements from activation and relaxation or from reversing the polarity of the electrodes.

The actuators comprising highly electroactive materials shown in FIG. 1, FIG. 2, FIG. 3, FIG. 4, and FIG. 5 may be used as highly electroactive actuators. The highly electroactive material(s) can be spherical, cylindrical, conical, pyramidal, prism-shaped, spheroid, ellipsoid, cubical, rectangular prism shaped, toroid, parallelepiped-shaped, rhombic prism shaped, or any combination thereof. In FIG. 3, FIG. 4, and FIG. 5, the negative electrode may be part of the coating or incorporated into the coating. In FIG. 1, FIG. 2, FIG. 3, FIG. 4, and FIG. 5, the electrodes may be plasma treated, etched, or otherwise treated, and may be shaped, such as spiral or spring shaped electrodes. The highly electroactive material itself or highly electroactive actuator may be used individually or grouped together in fibers, bulk, slabs, or bundles, to hinge joints, rotator (ball-and-socket) type joints, other hinges, other joints, valves, catheters, stents, levers, or other objects. Alternatively or in addition to solvent, electrolyte solution or electrolyte gel formulation, carbon particles, fibers, weaves, felts, nano-particles, or nano-tubes metal ions, or any other electrically conductive material, may be present in the highly electroactive material to enhance electroactivity. A higher cross-link density formulation can be used in the distal regions of the electroactive material where the electrode(s) or any attachment(s) enter the electroactive material. Adhesive can be applied to the areas where the electrodes or fibers protrude from the coating to provide additional strength and to prevent leakage.

LIST OF REFERENCE NUMERALS

1—highly electroactive material
2—positive electrode
3—negative electrode
4—flexible encapsulating coating
5—attachment, filament, mesh, net, wire, fiber, or web-like structure
6—filaments, meshes, nets, wires, fibers, or web-like structures
7—filaments, meshes, nets, wires, fibers, or web-like structures
8—lever
9—lever
10—rigid coating

DETAILED DESCRIPTION OF THE PREFERRED EMBODIMENT(S)

The present invention is based upon the discovery that a novel, superior, highly electroactive material and electroactive actuator are produced by optimizing the composition of ion-containing electroactive materials, including the incorporation of the acetate of methacrylic acid with its associated cation, the degree of cross-linking of the electroactive material, including the use of one or more different cross-linking agents, the dilution of the monomer mix prior to polymerization, multi-phasic syntheses to give different physical properties in different areas of the electroactive material, the choice of solvent(s), the choice of antifreeze if needed, treatment of the electrodes, the configuration and shape of the electrodes, connection of attachment(s) to the highly electroactive material and to other objects, coating the highly electroactive material, coating the highly electroactive material with a bilayer coating, where the inner bilayer of the coating is conductive and can act as the slightly external electrode and the outer bilayer of the coating is elastomeric and helps retain the moisture and integrity of the highly electroactive material, and coating the highly electroactive material with a trilayer, where the inner most layer forces actuation in the desired direction, the middle layer serves as the negative electrode, and the out most layer is elastomeric and helps retain the moisture and integrity of the highly electroactive material. The polymer-metal interface of the electrodes and the highly electroactive material is significantly improved by plasma treatment of the electrodes, preferably nitrogen plasma followed by oxygen plasma, using a multi-phasic synthetic approach to tether the electrodes and any attachments where they enter the highly electroactive material, and using shaped embedded electrode(s). The strength of the polymer-metal interface is crucial in any application where movement is encountered, particularly the preferred movements of the instant invention, contraction and expansion.

Example of the test procedure used follow.

Example 1

Tests are conducted by placing the preferred ingredients of the composition for the highly electroactive material into vials or test tubes of sufficient volume to accommodate the size of the of the electroactive polymer desired, then the vial or test tube is shaken by hand, although stir bars or other mechanisms may be used. The vial or test tube sizes are from 10 mm to 15 mm in diameter. Tubing of 5 mm in diameter or less is also used when strands for tendon-like material is wanted. The ingredient mixtures are purged with an inert gas such as nitrogen, helium, or argon prior to polymerization to exclude oxygen. Oxygen inhibits excited state and free radical polymerizations. Polymerization is conducted using ultraviolet (UV) induced excited state photo-initiation and can also use thermal free radical initiation, visible light induced photo-initiation, or gamma radiation initiation.

Example 2

For example, in a vial, methacrylic acid (linear functionality equals 2), acetate of methacrylic acid, sodium salt (linear functionality equals 2), poly(ethylene glycol) dimethacrylate (cross-linking agent, functionality equals 4), UV initiator such as 1-hydroxycyclohexyl phenyl ketone, visible light initiator such as phenylbis(2,4,6-trimethylbenzoly) phosphine oxide, or thermal free radical initiator such as 2,2-azobisisobutyronitrile or benzoyl peroxide, and water or glycerol as the solvent. The vial is purged with inert gas to remove oxygen. Then the vial is typically stirred by swirling by hand, and polymerizing to gelation using UV or visible light for excited state photo-polymerizations, heat for free radical polymerizations, or gamma radiation for excited state polymerizations.

The preferred composition for the electroactive material, 1, is a blend of methacrylic acid and the actetate of methacrylic acid with its associated cation such as sodium ion, or other suitable ion-containing monomers, with or without 2-hydroxyethyl methacrylate or other non-ionic monomers, cross-linked with poly(ethylene glycol) dimethacrylate, or other suitable cross-linking agents, such as diurethane dimethacrylate, ethylene glycol dimethacrylate, 1,1,1-trimethylolpropane trimethacrylate, or a combination of cross-linking agents, preferably at a low level of cross-linking, preferably within a range of 0.30 to 2.5 mole percent poly(ethylene glycol) dimethacrylate ($<M_n>\sim330$ g/mole) with respect to methacrylic acid and methacrylic acetate. These materials are produced using standard free radical polymerization, photo-polymerization, or gamma polymerization methods, preferably in the presence of solvent(s), preferably a solvent compatible with the monomer(s) such as water, glycerol, or organic alcohol(s). Prepolymers or oligomers may also be used. Cross-linking greatly improves the resilience, toughness, and in some cases, strength, of the electroactive materials, and within a defined range, may optimize the electroactive movement of contraction or expansion. A variety of materials may comprise the highly electroactive material, such as poly(vinyl alcohol), ionized poly(acrylamide), poly(acrylic acid), poly(acrylic acetate), poly(acrylic acid)-co-(poly(acrylamide), poly(2-acrylamide-2-methyl-1-propane sulfonic acid), poly(methacrylic acid), poly(styrene sulfonic acid), quarternized poly(-vinyl pyridinium chloride), and poly (vinylbenzyltrimethyl ammonium chloride), sulfonated poly(styrene-b-ethylene)-co-poly(butylene-b-styrene), sulfonated poly(styrene), or any material that responds to electricity by movement, contraction, expansion, curling, bending, buckling, or rippling.

To compare electroactivity between the cross-linked poly (methacrylic acid) materials described in U.S. Pat. No. 8,088,453 and the cross-linked poly(methacrylic acid)-co-poly(methacrylic acetate, sodium salt) in the instant invention, the novel highly electroactive materials in the instant invention, in addition to being extremely electroactive, particularly in terms of speed, are easier to produce, with much less volatiles during synthesis, the post-synthesis electrolytic induction is not required, and the unneeded anion (from electrolyte induction) is therefore eliminated in the final product.

Another attribute of the highly electroactive materials and highly electroactive actuators in the instant invention, which are capable of contraction and expansion, is that the amount of contraction can be controlled by the amount of electric input simply by adjusting the voltage. Table 2 shows the amount of contraction, or expansion when the polarity is reversed, depends upon the amount of voltage applied for a given time period. This can be applied using a combination of high and low voltages as well. Controlling the applied voltage in these highly electroactive materials and actuators could be very useful for creating motor function. It is very important for muscles to be able to partially contract, for example, to be able to hold an egg with one's fingers without breaking it. If muscles could only completely contract, nobody could hold an egg without breaking it. A combination of high and low voltages could produce gross and fine motor skills, respectively, providing both large motor control and fine motor control (fine manipulation) within the same actuator unit. The ability to control the amount of electroactive actuation by the amount of electric input in these highly electroactive materials and actuators can be tied in with biofeedback.

TABLE 2

Control of amount of contraction or expansion by voltage level.

| Experimental conditions for highly electroactive polymer (EAP) material comprising cross-linked poly(methacrylic acid)-co-poly(methacrylic acetate, sodium salt) | % Change from original weight |
| --- | --- |
| Positive electrode embedded in EAP, 60 seconds, 5 V | 92% (contraction) |
| Positive electrode embedded in EAP, 60 seconds, 15 V | 86% (contraction) |
| Negative electrode embedded in EAP (reverse polarity), 60 seconds, 5 V | 105% (expansion) |
| Negative electrode embedded in EAP (reverse polarity), 60 seconds, 15 V | 144% (expansion) |

The electrodes are preferably titanium based, but may be any suitably conductive material. The ends of the electrodes are preferably splayed, untwisted or arranged into one or more filaments, meshes, nets, wires, or fibers, and may be plasma treated, base treated, etched, or otherwise treated, preferably with nitrogen plasma, oxygen plasma, or a combination such as nitrogen plasma followed by oxygen plasma. Because the monomer mix is ionic, a hydrophilic metallic surface is desired for good metal-polymer adhesion. Using the nitrogen, oxygen, and synthetic air plasma treatment improves the polymer-metal interface, particularly for titanium; however, using oxygen plasma has many safety considerations. For applications where a great deal of flexibility is desired, carbon fibers, meshes, weaves, or felts can be used as electrodes.

The splayed, untwisted, or arranged ends of the electrodes, which are preferably plasma treated titanium, are then placed into position, preferably but not necessarily, in a mold prior to the polymerization and cross-linking of the highly electroactive material. The positive electrode is preferably in the electroactive material to a greater degree than the negative electrode, where the negative electrode may even be external to the electroactive material. After polymerization and cross-linking, the highly electroactive material is then allowed, if needed, to absorb solvent, such as water, glycerol, diethylene glycol, organic alcohol(s), or any conductive liquid, and preferably water.

The coating(s), covering(s), or encapsulation(s), comprise any suitable elastomer, such as natural rubber, poly(butadiene), poly(vinylidene chloride), selected polyurethanes, VHB tape, Press'nSeal®, Tesa Tape®, shrink-wraps, or combination of materials, which can be mated, sputter coated, or otherwise encapsulated around the highly electroactive material, parts of the electrodes, and possibly other connective fibers protruding from the electroactive material. The coating(s) can be a bilayer, where the inner layer of the bilayer coating serves as negative electrode, slightly external to the electroactive material (but still in electric contact through conductive solvent) and the outer layer of the bilayer coating is any suitable elastomer, or a trilayer, where the inner most layer forces actuation in the desired direction, the middle layer serves as the negative electrode, and the out most layer is elastomeric and helps retain the moisture and integrity of the highly electroactive material.

Shaped electrodes, such as bending, spiral, or preferably spring shaped electrodes can be used for the embedded electrode(s), which can flex when the highly electroactive material is actuated. Also, a higher matrix formulation can be used at the distal ends of the electroactive material of the electroactive actuator, where the electrode(s) and any attachment(s) enter the electroactive material. The formulations at the distal ends of the electroactive material are preferably poly(methacrylic acid) cross-linked with at least 5 mole percent cross-linking agent with respect to linear (functionality=2) monomer(s). Other cross-linking strategies, polymers, glues, tapes, or adhesives can also be used to tether the embedded electrode(s) and any attachment(s) into place.

The highly electroactive material operates when electricity flows through the electrodes, which causes the material to move, expand, curl, bend, ripple, buckle, or preferably, contract. By optimizing the composition of the highly electroactive material and the configuration of the electrodes, a highly electroactive material was developed that contracts over 50% from original its weight within 30 seconds at fifty volts, and when the polarity is reversed, expands over 150% from its original weight within 30 seconds at fifty volts. When the electricity is stopped, the highly electroactive material relaxes back to its original conformation. The polarity of the electrodes may be reversed to expedite the highly electroactive material back to its original conformation or to cause another mode of movement, such as contraction or expansion, or any combination of movements may be used. An example of combining movements is to arrange, place, or configure the highly electroactive materials or highly electroactive actuators as antagonistic pairs, similar to how muscles are arranged around joints.

The highly electroactive materials and highly electroactive actuators of this invention act as artificial muscle. These electroactive materials and actuators may move in two and three dimensions by arranging the highly electroactive material itself or the highly electroactive actuator, individually or grouped together, in fibers, bulk, slabs, bundles, or other configurations, to hinge joints, rotator (ball-and-socket) type joints, other joints, other hinges, hole-filling applications, hole-plugging applications, valves, catheters, stents, levers, or other objects, to produce movement or work when the highly electroactive actuator is activated by electricity, when the highly electroactive actuator relaxes or returns to its original conformation after the electricity is stopped, when the polarity of the electrodes is reversed, or a combination of movements from activation and relaxation or from reversing the polarity of the electrodes. The novel, superior, highly electroactive material and highly electroactive actuator of this invention may have an enormous impact on prostheses, valves, and automated systems, particularly robots, by providing for smooth two and three dimensional range of motion, good durability, high strength, and a mode of movement, namely contraction, that allows for human-like prosthetic and robotic designs with life-like motion and feel.

Alternative embodiments of practicing the invention, but within the spirit thereof, will in light of this disclosure, occur to persons skilled in the art. It is intended that this description be taken as illustrative only, and not be construed in any sense except by the following claims.

I claim:

1. A method for producing a highly electroactive material and a highly electroactive actuator having movement when activated by electrical stimulation comprising:
    providing a mixture of reactants comprising:
        (a) at least one ion-containing monomer selected from the group consisting of methacrylic acid, acrylic acid, ionized 2-acrylamide, 2-methyl-1-propane sulfonic acid-2-acrylamide, styrene sulfonic acid, quarternized 4-vinyl pyridinium chloride, vinylbenzyltrimethyl ammonium chloride, sulfonated styrene-13-ethylene, sulfonated styrene-13-butylene, sulfonated styrene, and a combination thereof;
        (b) at least one salt form of the ion-containing monomer;
        (c) at least one cross-linking agent, with a functionality of 3 or greater;
        (e) at least one diluent compatible or miscible with said ion-containing monomer(s);
        at least one solvent compatible with the monomer(s);
    polymerizing and cross-linking said reactants (a)-(c) in reactants (e) and (f) to produce a highly electroactive material; and
    placing at least one conductive electrode in or near said highly electroactive material to produce a highly electroactive actuator comprising the highly electroactive material and the conductive electrode.

2. The method as defined in claim 1 wherein said ion-containing monomer of the highly electroactive material and the highly electroactive actuator is methacrylic acid.

3. The method as defined in claim 1 wherein said salt form of the ion-containing monomer of the highly electroactive material and the highly electroactive actuator is the acetate of methacrylic acid with its associated cation.

4. The method as defined in claim 1 wherein said ion-containing monomer is a linear monomer or combination of monomers.

5. The method as defined in claim 1 wherein said salt form of the ion-containing monomer is a linear monomers or combination of monomers.

6. The method as defined in claim 1 wherein said cross-linking agent of the highly electroactive material and the highly electroactive actuator is poly(ethylene glycol) dimethacrylate.

7. The method of claim 6, wherein the poly (ethylene glycol) dimethacrylate has a number average molecular weight around 300 to 500 grams per mole.

8. The method as defined in claim 1 wherein said diluent is selected from the group consisting of water, glycerol, organic alcohol(s), and a combination thereof.

9. The method as defined in claim 1 wherein said solvent is selected from a group consisting of water, glycerol, diethylene glycol, organic alcohol(s), and a combination thereof.

10. The method as defined in claim 9 wherein an antifreeze agent is added to the solvent to help retain the integrity of the highly electroactive material in extreme environmental conditions, wherein the antifreeze agent is selected from the group consisting of glycerol, diethylene glycol, and a combination thereof.

11. The method as defined in claim 1 wherein said conductive electrode placed in or near the highly electroactive material is selected from the group consisting of metal electrodes and conductive carbon electrodes.

12. The method of claim 11, wherein said conductive electrodes are plasma treated and having ends that are splayed, untwisted, or arranged into one or more filaments, meshes, nets, wires, or fibers.

13. The method of claim 11, wherein the conductive electrodes are plasma treated and having ends that are filaments, meshes, nets, wires, fibers, or web-like structures connected to said highly electroactive material, and are connected to levers.

14. The method as defined in claim 1 wherein said highly electroactive material is coated with at least one thin elastomeric covering, wherein said elastomeric covering acts as humanlike fascia, perimysium, epimysium, and skin.

15. The method of claim 14, wherein the elastomeric covering allows said highly electroactive material to be operational with or without contact with a solvent.

16. The method as defined in claim 1 wherein said highly electroactive material is coated with at least two coverings comprising an inner covering and an outer covering, where the inner covering serves as the negative electrode and the outer covering helps retain the moisture and integrity of said electroactive material.

17. The method as defined in claim 1 wherein said highly electroactive material is coated with at least three coverings comprising an inner covering, a middle covering and an outer covering, where the inner covering is rigid and open ended to help control the direction of actuation, the middle covering serves as the negative electrode, and the outer most covering helps retain the moisture and integrity of said highly electroactive material.

18. The method of claim 1, further comprising using the highly electroactive actuator in an artificial muscle configured to be used anywhere movement is required.

19. The method of claim 1, wherein the highly electroactive material is a polymer, copolymer, or cross-linked polymer comprising polymerized methacrylic acid, acetate of methacrylic acid, a cation salt thereof, or a cross-linked polymer thereof comprising cross-linker poly(ethylene glycol) dimethacrylate.

20. The method of claim 19, wherein the highly electroactive material comprises a polymer selected from the group consisting of polymerized functionalized monomers of methacrylate, acrylate, acrylic acid, vinyl alcohol, ionized 2-acrylamide, 2-methyl-1-propane sulfonic acid, styrene sulfonic acid, quarternized 4-vinyl pyridinium chloride, vinylbenzyltrimethyl ammonium chloride, sulfonated styrene-13-ethylene, sulfonated styrene-13-butylene, sulfonated styrene, methacrylic acetate, acrylic acetate, and any combination thereof; and wherein the polymer is optionally cross-linked by a cross-linking agent selected from the group consisting of poly(ethylene glycol) dimethacrylate, diurethane dimethacrylate, ethylene glycol dimethacrylate, 1,1,1-trimethylolpropane trimethacrylate, and any combination thereof.

21. The method of claim 1, wherein the highly electroactive material comprises an ion-containing, flexible electroactive material which is cross-linked at a low level of cross-linking agent with respect to linear monomer, contains less than 5.0 mole percent poly(ethylene glycol) dimethacrylate ($<Mn>\sim330$ g/mole) with respect to methacrylic acid and methacrylic acetate with its associated cation, is polymerized with or without solvent, and is optionally allowed to swell further in the presence of the solvent.

22. The method of claim 21, wherein said solvent is selected from a group consisting of water, glycerol, diethylene glycol, organic alcohol(s), and a combination thereof.

23. The method of claim 21, wherein the highly electroactive material comprises an ion-containing, flexible highly electroactive material which is cross-linked within a narrow range of said cross-linking agent with respect to linear monomer(s), is within the range of 0.30 to 2.5 mole percent poly(ethylene glycol) dimethacrylate ($<Mn>\sim330$ g/mole) with respect to monomers methacrylic acid and methacrylic acetate with its associated cation, is polymerized preferably with solvent, is optionally allowed to swell further in the presence of the solvent.

24. The method of claim 23, wherein said solvent is selected from a group consisting of water, glycerol, diethylene glycol, organic alcohol(s), and a combination thereof.

25. The method of claim 1, wherein the conductive electrode is titanium based, treated with nitrogen plasma, oxygen plasma, or nitrogen plasma followed by oxygen plasma.

26. The method of claim 1, wherein the conductive electrode is made from carbon based fibers, weaves, felts, or springs.

27. The method as defined in claim 1 wherein the at least one conductive electrode comprises a positive electrode and a negative electrode, wherein the positive electrode is inserted further into said highly electroactive material of said highly electroactive actuator than the negative electrode to increase contraction of said highly electroactive material and highly electroactive actuator.

28. The method as defined in claim 1 of wherein the at least one conductive electrode comprises a negative electrode, wherein the negative electrode may be placed in or near said highly electroactive material.

29. The method of claim 1, wherein movement of said highly electroactive material and said highly electroactive actuator is caused by applying electricity through the conductive electrode to cause bending, expansion, curling, buckling, rippling, contraction, or any combination of these movements.

30. The method of claim 29, wherein the more electricity applied produces more pronounced movement up to a threshold of breakdown at which point breakdown of the highly electroactive material or the highly electroactive actuator occurs.

31. The method of claim 30, wherein the movement of said highly electroactive material and said highly electroactive actuator is applied to biofeedback.

32. The method of claim 29, wherein the more electricity that is applied the faster, more pronounced the movement.

33. The method of claim 29, wherein at the ending of the application of electricity or reversing the polarity causes the highly electroactive actuator to relax and return to its original conformation in terms of size, weight and shape.

34. The method as defined in claim 1 wherein said highly electroactive material and said highly electroactive actuator are fibers, bulk, slabs, bundles, or connected or attached to hinge joints, ball-and-socket rotor type joints, hinges, hole-filling applications, hole-plugging applications, valves, catheters, stents, or levers.

35. The method of claim 1, wherein the at least one conductive electrode comprises a positive electrode and a negative electrode, wherein when the positive electrode is embedded into said highly electroactive material and the negative electrode is placed near said highly electroactive material, an applied electricity produces contraction of said highly electroactive material; and wherein when the polarity of applied electricity is reversed, said highly electroactive material expands.

36. The method of claim 35, wherein by alternately reversing the polarity of said positive and negative electrodes continually produces alternating contraction and expansion cycles of said highly electroactive material repeatedly.

37. The method of claim 1, wherein the at least one conductive electrode comprises a positive electrode and a negative electrode; and wherein when the negative electrode is embedded into said highly electroactive material and the positive electrode is placed near said highly electroactive material, an applied electricity produces expansion of said highly electroactive material; and wherein when the polarity of applied electricity is reversed, said highly electroactive material contracts.

38. The method of claim 37, wherein alternately reversing the polarity of said positive and negative electrodes continually produces alternating expansion and contraction cycles of said highly electroactive material repeatedly.

39. The method of claim 1, further comprising providing an aqueous solvent and a fuel cell system, wherein said highly electroactive actuator is configured to operate above 1.23 V and produce gases in the aqueous solvent; and wherein the gases are used by the fuel cell to produce electricity and water, which are provided back to said highly electroactive actuator.

40. The method as defined in claim 1 wherein the highly electroactive material is in a complex shape.

41. The method of claim 40, wherein the complex shape is a toroid shape.

42. The method of claim 41, further comprising operating the highly electroactive material as a peristaltic valve for a peristaltic pump on the outside of a liner.

43. The method of claim 42, further comprising providing a fuel cell system to provide energy for the peristaltic pump to move liquid, sludge, and bilge.

44. The method as defined in claim 1 wherein said highly electroactive material comprises multi-phasic materials with different zones having different physical properties.

45. The method of claim 44, wherein the zone adjacent to the conductive electrode comprise higher levels of cross-linking to tether the conductive electrode into place.

46. The method of claim 44, further comprising providing one or more attachments placed in the highly electroactive material; wherein the zone adjacent to the attachment comprise higher levels of cross-linking to tether the attachment in place.

47. The method of claim 1, wherein the salt form in step (b) is a salt formed by the ion-containing monomer and a Group I cation.

48. The method of claim 47, wherein the Group I cation is selected from the group consisting of a sodium cation, a potassium cation, and a combination thereof.

49. The method of claim 1, wherein the ion-containing monomer is selected to respond to electricity by movement, expansion, contraction, curling, bending, buckling, or rippling.

50. A method for producing a highly electroactive material and highly electroactive actuator that contracts and moves in response to applied electrical voltage comprising:
   (a) mixing methacrylic acid monomer, the acetate of methacrylic acid with its associated cation, poly(ethylene glycol) dimethacrylate with a number average molecular weight around 330 grams per mole, diluting with a solvent selected from the group consisting of glycerol, water, organic alcohols, and a combination thereof;
   (b) polymerizing the resulting mixture of step (a) to produce a highly electroactive material; and
   (c) placing at least one conductive electrode in said highly electroactive material to produce a highly electroactive actuator.

51. The method as defined in claim 50, wherein step (b) comprises polymerizing the resulting mixture of step (a) with heat, visible light, UV light, or gamma radiation.

* * * * *